US012619695B2

(12) United States Patent
Jordanov

(10) Patent No.: US 12,619,695 B2
(45) Date of Patent: May 5, 2026

(54) SYSTEMS AND METHODS FOR AI ASSISTED BIOMETRIC AUTHENTICATION

(71) Applicant: Samsung Electronics Company, Ltd., Suwon Si (KR)

(72) Inventor: Alexi Georgiev Jordanov, New Westminster (CA)

(73) Assignee: Samsung Electronics Company, Ltd., Suwon City (KR)

( * ) Notice: Subject to any disclaimer, the term of this patent is extended or adjusted under 35 U.S.C. 154(b) by 353 days.

(21) Appl. No.: 18/184,411

(22) Filed: Mar. 15, 2023

(65) Prior Publication Data

US 2024/0311457 A1      Sep. 19, 2024

(51) Int. Cl.
*G06F 21/32* (2013.01)
*G06N 20/00* (2019.01)

(52) U.S. Cl.
CPC ............. *G06F 21/32* (2013.01); *G06N 20/00* (2019.01)

(58) Field of Classification Search
CPC ............... H04L 63/0861; H04L 9/3231; G06F 2221/2111; G10L 17/00; G10L 17/04; G06V 40/70
See application file for complete search history.

(56) References Cited

U.S. PATENT DOCUMENTS

| | | | |
|---|---|---|---|
| 8,583,574 B2 | 11/2013 | Rodriguez | |
| 8,941,466 B2 | 1/2015 | Bayram et al. | |
| 9,430,629 B1 * | 8/2016 | Ziraknejad | ............ G06F 16/583 |
| 11,256,791 B2 * | 2/2022 | Douglas | .................. G06F 21/32 |
| 2010/0162386 A1 * | 6/2010 | Li | ............................ G06F 21/32 |
| | | | 726/19 |
| 2014/0133710 A1 * | 5/2014 | Hama | ..................... G06F 21/32 |
| | | | 382/115 |
| 2016/0180068 A1 * | 6/2016 | Das | ..................... H04L 63/0861 |
| | | | 726/7 |
| 2016/0292536 A1 * | 10/2016 | Irie | ...................... G06V 40/172 |
| 2017/0111175 A1 * | 4/2017 | Oberhauser | ............. G06F 21/33 |
| 2018/0000367 A1 * | 1/2018 | Longinotti-Buitoni | ...................... |
| | | | A61B 5/117 |
| 2018/0196936 A1 * | 7/2018 | Arunkumar | ............. H04L 63/08 |

(Continued)

FOREIGN PATENT DOCUMENTS

| | | |
|---|---|---|
| KR | 102126197 B1 | 6/2020 |
| KR | 20210028469 A | 3/2021 |

(Continued)

OTHER PUBLICATIONS

A. Alzubaidi and J. Kalita, "Authentication of Smartphone Users Using Behavioral Biometrics," in IEEE Communications Surveys & Tutorials, vol. 18, No. 3, pp. 1998-2026, thirdquarter 2016, doi: 10.1109/COMST.2016.2537748. (Year: 2016).*

(Continued)

*Primary Examiner* — Philip J Chea
*Assistant Examiner* — Dorianne Alvarado David
(74) *Attorney, Agent, or Firm* — Baker Botts L.L.P.

(57) ABSTRACT

In one embodiment, a method includes receiving biometrics of a user to access the electronic device. The method may access one or more contextual parameters affecting a state of the user. The method may verify, using a trained machine-learning model, the biometrics of the user based on the one or more contextual parameters affecting the state of the user. The method may provide access to the electronic device in response to successful verification.

20 Claims, 8 Drawing Sheets

(56) References Cited

U.S. PATENT DOCUMENTS

| | | | | |
|---|---|---|---|---|
| 2019/0044723 A1* | 2/2019 | Prakash | ............. | H04L 9/3234 |
| 2019/0044942 A1* | 2/2019 | Gordon | ............. | H04L 63/0861 |
| 2019/0122024 A1* | 4/2019 | Schwartz | ........... | G06V 40/1376 |
| 2019/0163888 A1* | 5/2019 | Braundmeier | ......... | G06F 21/32 |
| 2019/0220583 A1* | 7/2019 | Douglas | ................ | G06V 40/70 |
| 2019/0347391 A1* | 11/2019 | Kim | ........................ | G06F 21/32 |
| 2020/0027091 A1* | 1/2020 | Hassani | ............. | H04L 63/0807 |
| 2020/0302169 A1* | 9/2020 | Short | .................... | G06V 40/20 |
| 2021/0342427 A1* | 11/2021 | Popov | .................. | H04W 12/63 |
| 2022/0224683 A1* | 7/2022 | Solano Gomez | ...... | G06N 20/00 |
| 2022/0237274 A1* | 7/2022 | Paul | ....................... | G06F 21/35 |
| 2022/0377542 A1* | 11/2022 | Moton, Jr. | ........... | H04W 12/68 |
| 2023/0259600 A1* | 8/2023 | Belli | ..................... | G06V 40/40 |
| | | | | 726/16 |

FOREIGN PATENT DOCUMENTS

| | | | | | |
|---|---|---|---|---|---|
| RU | 2355307 C2 | 5/2009 | | | |
| WO | WO2006055767 A2 | 5/2006 | | | |
| WO | WO-2024124338 A1 * | 6/2024 | ......... | H04W 12/065 | |

OTHER PUBLICATIONS

A. Eremin, K. Kogos and A. Filina, "A concept of continuous user authentication based on behavioral biometrics," 2017 20th Conference of Open Innovations Association (FRUCT), St. Petersburg, Russia, 2017, pp. 62-68, doi: 10.23919/FRUCT.2017.8071293. (Year: 2017).*

W. Cheung and S. Vhaduri, "Context-Dependent Implicit Authentication for Wearable Device Users," 2020 IEEE 31st Annual International Symposium on Personal, Indoor and Mobile Radio Communications, London, UK, 2020, pp. 1-7, doi: 10.1109/PIMRC48278.2020.9217224. (Year: 2020).*

Y. Liang, S. Samtani, B. Guo and Z. Yu, "Behavioral Biometrics for Continuous Authentication in the Internet-of-Things Era: An Artificial Intelligence Perspective," in IEEE Internet of Things Journal, vol. 7, No. 9, pp. 9128-9143, Sep. 2020, doi: 10.1109/JIOT.2020.3004077. (Year: 2020).*

B. M. Alsellami and P. D. Deshmukh, "The Recent Trends in Biometric Traits Authentication Based on Internet of Things (IoT)," 2021 International Conference on Artificial Intelligence and Smart Systems (ICAIS), Coimbatore, India, 2021, pp. 1359-1365, doi: 10.1109/ICAIS50930.2021.9396007. (Year: 2021).*

Hazratifard M, Gebali F, Mamun M. Using Machine Learning for Dynamic Authentication in Telehealth: A Tutorial. Sensors (Basel). Oct. 9, 2022;22(19):7655. doi: 10.3390/s22197655. PMID: 36236752; PMCID: PMC9572725. (Year: 2022).*

Kanade, V. (2022) What Is a Support Vector Machine? Working, Types, and Examples. https://www.spiceworks.com/tech/big-data/articles/what-is-support-vector-machine/ (accessed Apr. 18, 2025). (Year: 2022).*

Turing. (2022). Deep Learning vs Machine Learning: The Ultimate Battle. https://www.turing.com/kb/ultimate-battle-between-deep-learning-and-machine-learning (Year: 2022).*

Wone, A., Di Manno, J., Charrier, C., & Rosenberger, C. (Dec. 2021). Impact of environmental conditions on fingerprint systems performance. In 2021 18th International Conference on Privacy, Security and Trust (PST) (pp. 1-5). IEEE. (Year: 2021).*

* cited by examiner

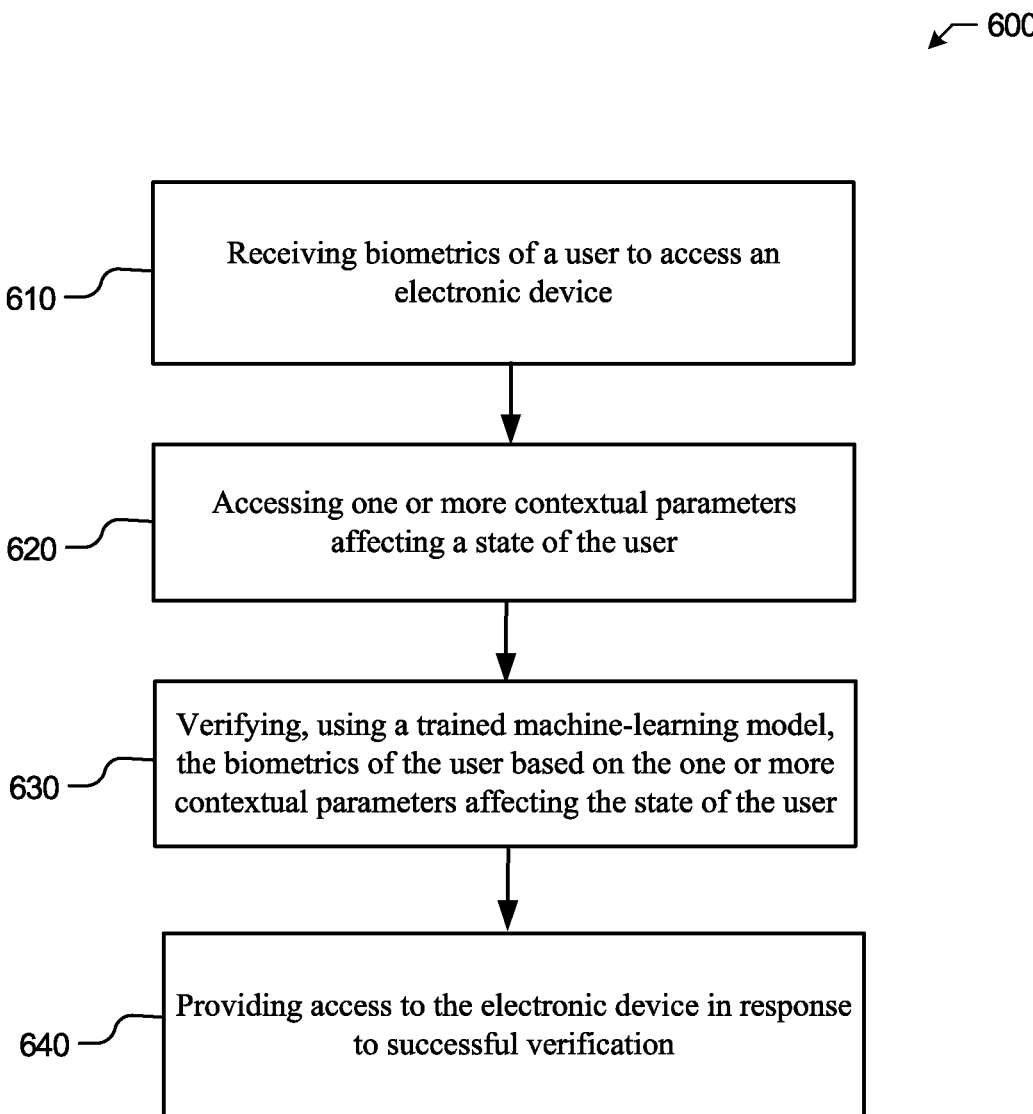

600

610 — Receiving biometrics of a user to access an electronic device

620 — Accessing one or more contextual parameters affecting a state of the user

630 — Verifying, using a trained machine-learning model, the biometrics of the user based on the one or more contextual parameters affecting the state of the user 640 — Providing access to the electronic device in response to successful verification

*FIG. 6*

SYSTEMS AND METHODS FOR AI ASSISTED BIOMETRIC AUTHENTICATION

TECHNICAL FIELD

This disclosure relates generally to database and file management within network environments, and in particular relates to verifying or authenticating biometrics of a user using a machine-learning model.

BACKGROUND

Nowadays people use their electronic devices for a variety of purposes. For instance, a user may use an electronic device to check their messages, make phone calls, check social feeds, make social interactions, capture images, record videos, etc. Such electronic devices may include, for example and without limitation, smartphones, tablets, computers, smartwatches, and so forth. Generally, a user of an electronic device may be requested to provide their biometrics to access the device. For instance, the user may be asked to provide their fingerprints by touching at a specific location on the device and the device may grant access (e.g., unlock device) if the device is successfully able to authenticate or validate the fingerprints. Sometimes, the device is not able to authenticate the biometrics of the user even when the user is in fact a genuine user. For instance, human biometrics are subject to change due to different natural factors. For example, skin may dry up and therefore changing the fingerprint characteristics. As a result, applying the fingerprint to unlock the mobile device may fail. Also, human biometrics may be applied in a way that resulting biometric vector is different from a recorded biometric vector (e.g., changing the angle of input biometrics) and as a result, the authentication attempt may incorrectly fail. As such, there is a need for a technique for biometric authentication of a user under such failed authentication attempts and/or circumstances.

BRIEF DESCRIPTION OF THE DRAWINGS

FIG. 6 illustrates a flow diagram of an example method for biometric authentication of a user using a trained machine-learning model.

DESCRIPTION OF EXAMPLE EMBODIMENTS

Biometric authentication is an essential way to get access to an electronic device, such as a smartphone, a tablet, a computer, a smartwatch, an artificial-reality system, etc. Some of the biometric authentication methods may include, for example and without limitation, fingerprint matching and sensing, credentials check (e.g., username, pin, password, etc.), retina scanning, face tracking, etc. Sometimes a user may have a hard time validating or authenticating their biometrics on their electronic device. For instance, the user may be able to validate their biometrics (e.g., fingerprints) at one time instance, but they may not be able to validate at a second time instance. Failure in such biometric authentication may be due to contextual parameters affecting or impacting a state of the user. These contextual parameters affecting the state of the user may include one or more of external contextual parameters relating to external environment surrounding the user or internal contextual parameters relating to internal mood or behavior of the user. The external contextual parameters may include, for example and without limitation, geolocation, time of day, season, weather conditions, outside temperature, humidity, etc. The internal contextual parameters may include, for example and without limitation, user behavior, user mood, user pulse rate, user heart rate, or user expressions. These external and/or internal contextual parameters may lead to failure in biometric authentication. As an example and not by way of limitation, different weather conditions, time of day, or season of the year may be causing skin dryness due to which a fingerprint sensor on the device is not able to correctly recognize the fingerprints of the user. One such example scenario is depicted in FIG. 1, as discussed below.

Figure 1:
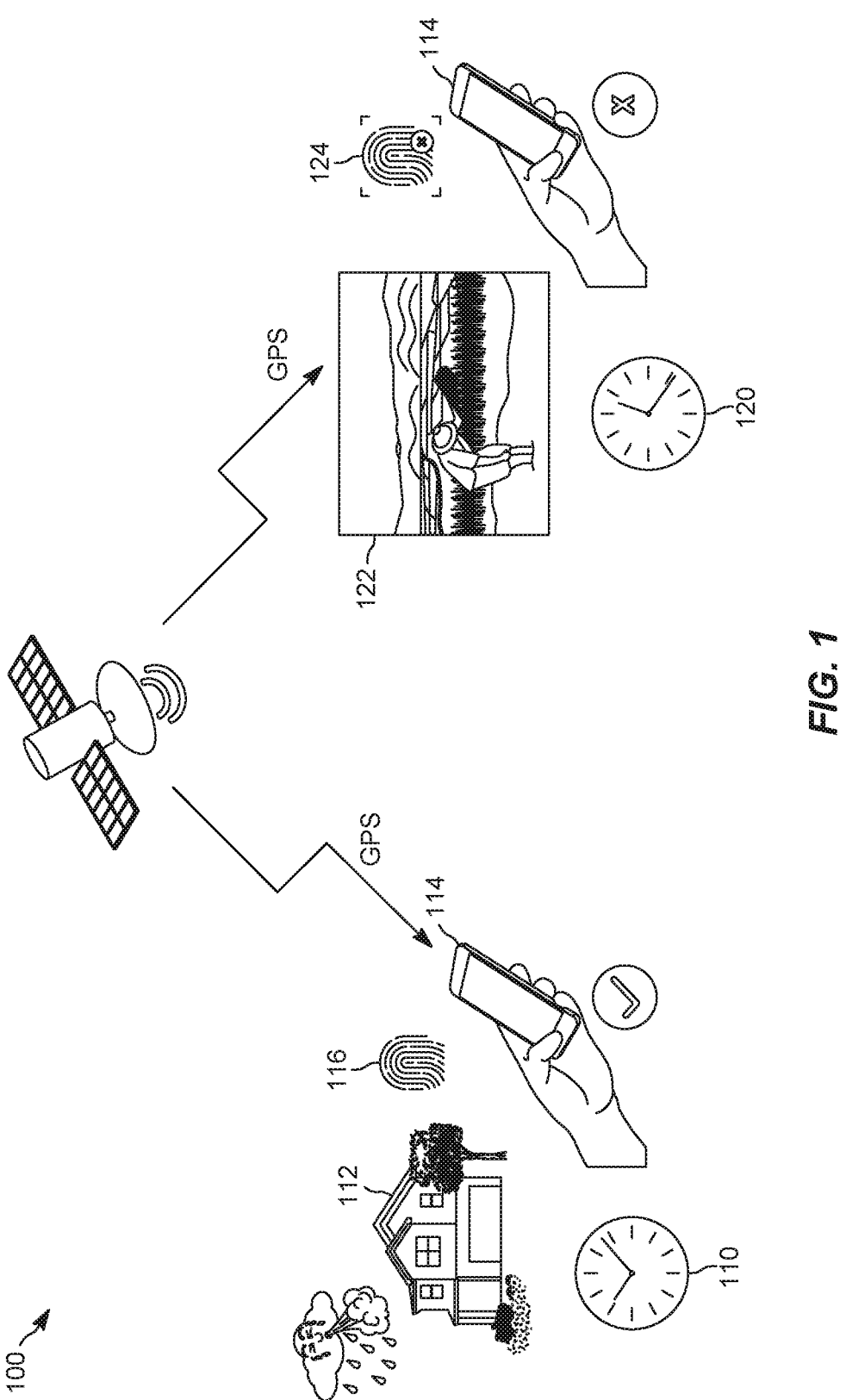
FIG. 1 illustrates an example scenario of biometric authentication of a user at two different time instances.

FIG. 1 illustrates an example scenario 100 of biometric authentication of a user at two different time instances 110 and 120. At the first time instance 110, it is raining and the user may be inside their home 112. When the user tries to unlock their device 114 by providing their fingerprints 116, the device 114 is able to successfully authenticate the user. This may be because the fingerprints 116 of the user might be all neat and clean as they are sitting in their home watching television, even though it is raining outside. At the second time instance 120, the user may be now out in a field 122 doing some field work (e.g., farming work). Due to the field work in the field 122, the user's skin may dry up. For instance, performing farming or backyard work may temporally affect the friction ridges of their fingers. Due to this, when the user now tries to unlock their device 114 by providing their fingerprints 124 at the second time instance 120, the device 114 is unable to recognize the user's fingerprints (e.g., due to skin dryness) and is unable to validate/authenticate the user.

As such, there is a need for a technique to successfully authenticate a user by taking into considerations different contextual parameters or factors that lead to failure in biometric authentication. Particular embodiments discussed herein relate to systems and methods for artificial intelligence (AI) assisted biometric authentication. The systems and methods discussed herein improves the experience with mobile biometric authentication and decreases failed attempts. Specifically, the systems and methods discussed herein trains a machine learning (ML) model based on one or more contextual parameters and uses the trained ML model to authenticate or validate biometrics of the user in case conventional techniques (e.g., fingerprint matching) of biometric authentication are unsuccessful. Using the ML model (also interchangeably herein referred to as an AI model) for biometric verification based on contextual information may be used to increase the chance of success and lower the failed attempts. It should be noted that the biometric authentication discussed herein relates more to fingerprint biometrical authentication, but the systems and methods are not limited to fingerprint biometrical authentication and other types of biometrical characteristics (e.g., eye, face, etc.) are also possible and within the scope of the present disclosure. Also, it should be noted that the terms "verify", "verification", "authenticate", "authentication", "validate", and "validation" are used interchangeably throughout this disclosure but they may have the same meaning or intention.

Figure 2:
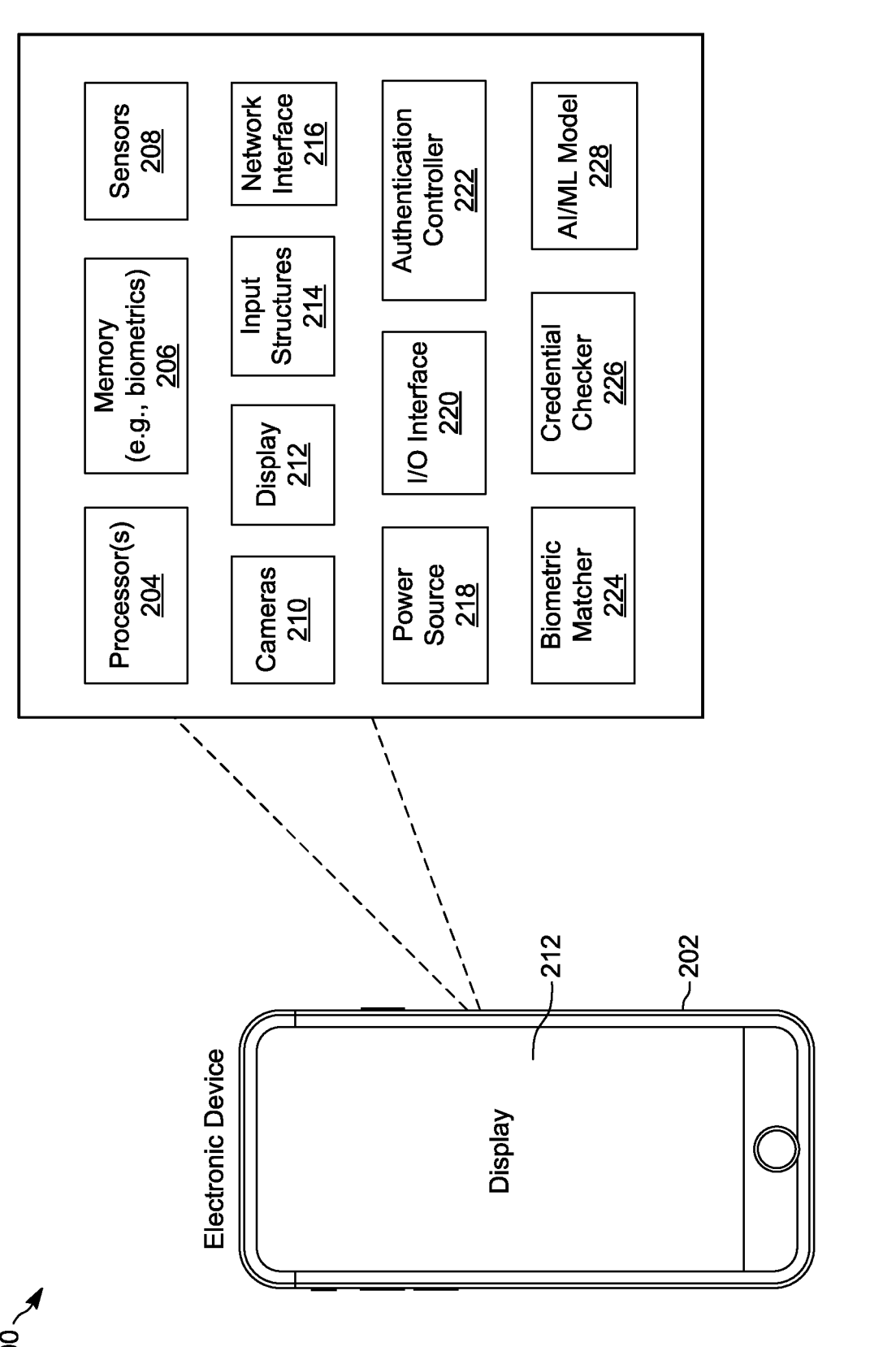
FIG. 2 illustrates an example electronic device.

FIG. 2 illustrates an example electronic device 200. In particular embodiments, the electronic device 200 may include, for example, any of various personal electronic devices 202, such as a mobile phone electronic device, a tablet computer electronic device, a laptop computer electronic device, and so forth. In particular embodiments, as further depicted by FIG. 2, the personal electronic device 202 may include, among other things, one or more processor(s) 204, memory 206, sensors 208, cameras 210, a display 212, input structures 214, network interfaces 216, a power source 218, an input/output (I/O) interface 220, an authentication controller 222, a biometric matcher 224, a credential checker 226, and an AI or ML model 228. It should be noted that FIG. 2 is merely one example of a particular implementation and is intended to illustrate the types of components that may be included as part of the electronic device 200. Also, it should be noted that the electronic device 200 is not by any way limited to the components depicted in FIG. 2 and additional components may be included and part of the electronic device 200.

In particular embodiments, the one or more processor(s) 204 may be operably coupled with the memory 206 to perform various algorithms, processes, or functions. Such programs or instructions executed by the processor(s) 204 may be stored in any suitable article of manufacture that includes one or more tangible, computer-readable media at least collectively storing the instructions or routines, such as the memory 206.

The memory 206 may include any suitable articles of manufacture for storing data and executable instructions, such as random-access memory (RAM), read-only memory (ROM), rewritable flash memory, hard drives, and so forth. Also, programs (e.g., an operating system) encoded on such a computer program product may also include instructions that may be executed by the processor(s) 204 to enable the electronic device 200 to provide various functionalities. In some embodiments, the memory 206 may store one or more components of the electronic device 200. For instance, the memory 206 may store the authentication controller 222, the biometric matcher 224, the credential checker 226, and the AI or ML model 228. These components may be stored in the memory 206 and executable by the one or more processors 204 to perform their functionalities discussed herein.

In particular embodiments, the memory 206 may store various biometrics and credentials of a user of the electronic device 200. As an example, when the user initially sets up the electronic device 200, the device 200 may ask for user fingerprints that may be used for subsequently unlocking the device 200, and the device 200 may store the user fingerprints in the memory 206. As another example, the device 200 may scan the facial characteristics (e.g., eyes, retina, etc.) of the user and store the facial characteristics in the memory 206 of the device 200 for biometric authentication later on. As yet another example, the device 200 may ask for user authentication credentials (e.g., username, pin, password, etc.) and store the credentials in the memory 206 for user authentication later on.

In particular embodiments, the sensors 208 may include, for example, one or more fingerprint sensors, cameras (e.g., depth cameras), touch sensors, microphones, motion detection sensors, thermal detection sensors, light detection sensors, time of flight (ToF) sensors, ultrasonic sensors, infrared sensors, or other similar sensors that may be utilized to detect various user inputs (e.g., user voice inputs, user gesture inputs, user touch inputs, user instrument inputs, user motion inputs, and so forth). By way of an example and not by way of limitation, the sensors 208 may include a fingerprint sensor, which is used to read the friction ridges of the fingers. In particular embodiments, the sensors 208 may send their sensor data (e.g., fingerprint data, weather data, location data, user facial characteristics, etc.) to the authentication controller 222 for biometric authentication, as discussed elsewhere herein.

The cameras 210 may include any number of cameras (e.g., wide cameras, narrow cameras, telephoto cameras, ultra-wide cameras, depth cameras, and so forth) that may be utilized to capture various 2D and 3D images. The display 212 may include any display architecture (e.g., AMLCD, AMOLED, micro-LED, and so forth), which may provide further means by which users may interact and engage with the electronic device 200. In particular embodiments, as further illustrated by FIG. 2, one more of the cameras 210 may be disposed behind, underneath, or alongside the display 212 (e.g., one or more of the cameras 210 may be partially or completely concealed by the display 212), and thus the display 212 may include a transparent pixel region and/or semi-transparent pixel region through which the one or more concealed cameras 210 may detect light, and, by extension, capture images. It should be appreciated that the one more of the cameras 210 may be disposed anywhere behind or underneath the display 210, such as at a center area behind the display 210, at an upper area behind the display 210, or at a lower area behind the display 210.

In particular embodiments, the input structures 214 may include any physical structures utilized to control one or more global functions of the electronic device 200 (e.g., pressing a button to power "ON" or power "OFF" the electronic device 200). The network interface 216 may include, for example, any number of network interfaces suitable for allowing the electronic device 200 to access and receive data over one or more servers, cloud-based networks (e.g., a cloud-based service that may service hundreds or thousands of the electronic device 200 and the associated users corresponding thereto), and/or distributed networks. The power source 218 may include any suitable source of power, such as a rechargeable lithium polymer (Li-poly) battery and/or an alternating current (AC) power converter that may be utilized to power and/or charge the electronic device 200 for operation. Similarly, the I/O interface 220 may be provided to allow the electronic device 200 to interface with various other electronic or computing devices, such as one or more auxiliary electronic devices.

In particular embodiments, the authentication controller 222 may be configured to authenticate the user of the electronic device 200 and grant or refuse access to the device 200. The authentication controller 222 may authenticate the user based on biometrics received from the user. In particular embodiments, the authentication controller 222 may receive the biometrics and other sensor data (e.g., contextual information) from the sensors 208 and coordinate or communicate with one or more of the biometric matcher 224, the credential checker 226, or the ML model 228 to verify the biometrics of the user, as discussed for example in reference to at least FIG. 3. Responsive to authentication, the authentication controller 222 may perform an appropriate action. As an example, the authentication controller 222 may send an error message to be displayed on the display 212 of the electronic device 200 if the biometrics are not verified. As another example, responsive to successful verification or authentication, the authentication controller 222 may unlock the device 200 and grant access to the user to use the device 200 thereon.

The biometric matcher 224 may be configured to perform biometric authentication by matching captured biometrics (e.g., current biometrics received from user) with stored biometrics in the memory 206 of the electronic device 200. In some embodiments, the biometric matcher 224 may perform the biometric matching according to a certain threshold and a time period within which the captured biometrics are received. For instance, the biometric matcher 224 may determine whether a match between the received/captured biometrics of the user and previously stored biometrics is within a certain threshold and whether a time of last successful verification is within a specific pre-configured time range and if the match is within the certain threshold and the time is within the specific pre-configured time range, then the biometric matcher 224 may successfully validate or authenticate the biometrics of the user. If in case the captured biometrics do not match with the stored biometrics according to the configured thresholds, then the biometric matcher 224 may return failed verification result to the authentication controller 222. In some embodiments, the biometric matcher 224 may resort to AI-assisted biometric authentication (e.g., verifying the biometrics using the ML model 228) if the biometric matching fails, as discussed for example in reference to at least FIG. 5.

The credential checker 226 may be configured to perform user authentication based on user credentials, such as password, pin, etc. In some embodiments, the credential checker 226 may receive the user credentials from the authentication controller 222. In other embodiments, the credential checker 226 may receive the user credentials directly from the user of the device 200. Once the user credentials are received, the credential checker 226 may verify the received credentials with stored credentials in the memory 206 of the electronic device 200. The credential checker 226 may send its verification results (e.g., verification passed or failed) to the authentication controller 222, which may then perform its respective operations thereon.

The AI or ML model 228 may be configured to perform biometric authentication of a user based on contextual information. The contextual information may include information impacting a user's state or condition leading to failed authentication using conventional techniques (e.g., biometric matching). For example, the contextual information may include weather conditions, time of the day, time of the year, or particular season leading to skin dryness and thereby affecting the friction ridges of user's fingers. Due to this, conventional techniques of biometric authentication may not be able to correctly recognize the user's biometrics (e.g., fingerprints) and fail to validate/authenticate the user. The ML model 228 may be trained to consider one or more contextual parameters responsible for failed authentication and validate/authenticate biometrics of the user accordingly, as discussed for example in reference to at least FIG. 3. In particular embodiments, the AI or ML model 228 may be based on a neural network responsible to classify the captured biometrics (e.g., whether biometrics are valid/invalid), and also to retrain the model. In particular embodiments, the AI or ML model 228 discussed herein is part of the AI architecture 802 shown and discussed in reference to FIG. 8.

In particular embodiments, the AI or ML model 228 may be trained responsive to successfully validating or authenticating the user using a conventional authentication technique. For instance, the ML model 228 may be trained responsive to the credential checker 226 successfully verifying the user credentials (e.g., password or pin) and determining that biometrics of the user are actually valid. The verification of the credential checker 226 may be used as ground truth for training the ML model 228. For training the AI or ML model 228, captured biometrics of the user that were provided to the conventional authentication technique (e.g., biometric checker 226) along with contextual parameters available at that time may be provided as inputs to the ML model 228. The ML model 228 is then trained to generate a verification result, which is compared with the ground truth. Based on the comparison, one or more components of the ML model 228 may be updated, as discussed for example in reference to at least FIG. 4.

In particular embodiments, the AI or ML model 228 may be stored in the memory 206 and configured to train and run locally on the electronic device 200. In some embodiments, the AI or ML model 228 may be trained or run on a cloud or a server, and the electronic device 200 may access the ML model 228 from the cloud and store in its memory 206 for local operation.

Figure 3:
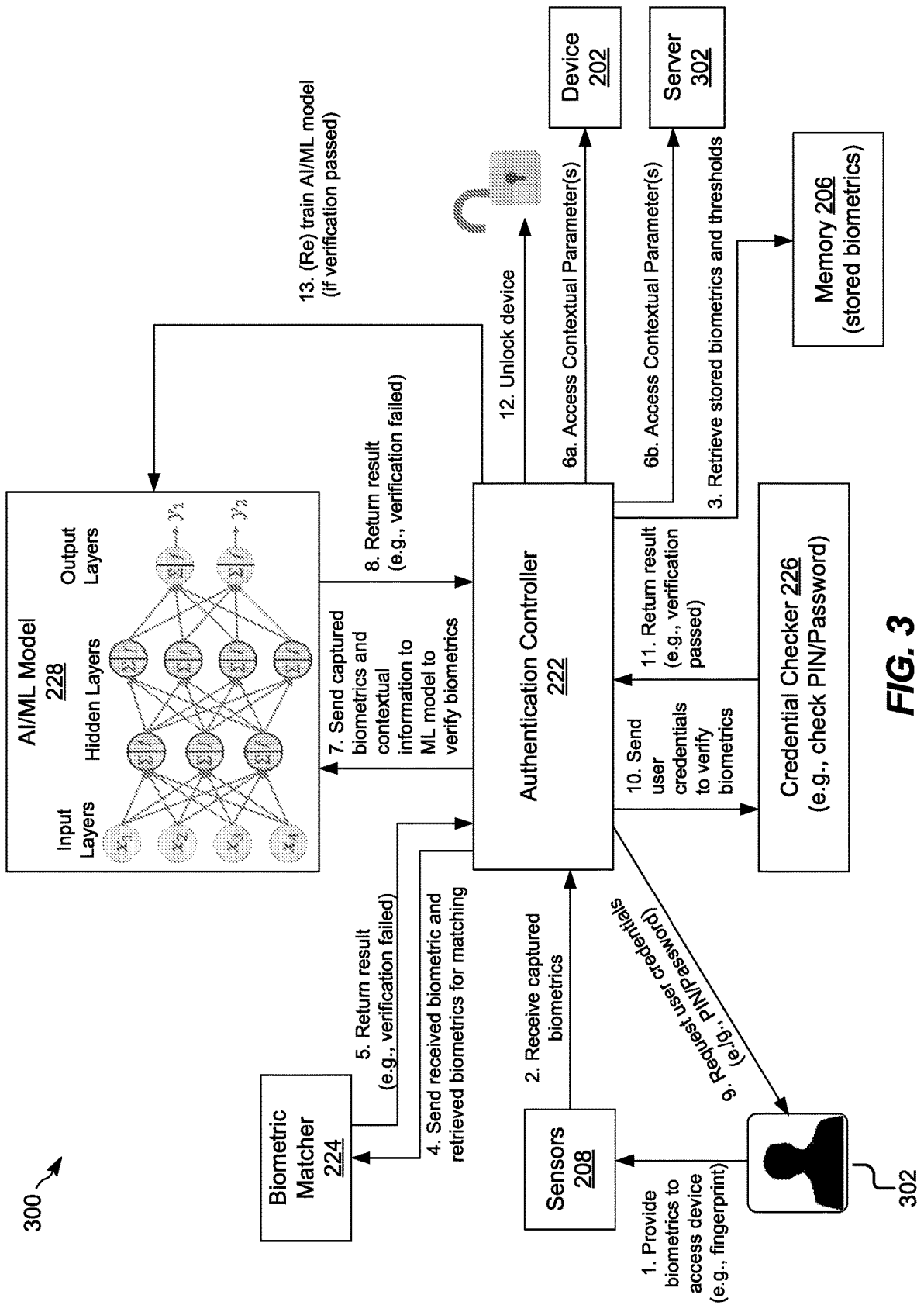
FIG. 3 illustrates an overall environment for biometric authentication of a user.

FIG. 3 illustrates an overall environment 300 for biometric authentication of a user 302. In particular embodiments, the environment 300 illustrates and describes example interactions between various components of the electronic device 200 for biometric authentication of the user 302. It should be noted that some of the reference numerals have been kept same throughout this disclosure to refer to the same entities or components that have been previously described and to avoid repetition of information. However, it should be understood that this is not by any way limiting and additional description and functionalities of these components are possible and within the scope of the present disclosure.

As depicted, at step 1, the user 302 may provide their biometrics to access a device, such as electronic device 200 or 202. The biometrics may be recognized by one or more sensors 208 of the device. As an example and without limitation, the user 302 may provide their fingerprints by touching on a specific location on the device 200 and a fingerprint sensor may capture the provided fingerprints. At step 2, the authentication controller 222 may receive the captured biometrics from the sensors 208. Responsive to receiving the biometrics, the authentication controller 222 may try to first perform biometric authentication using a first conventional technique, such as biometric matching. To perform the biometric matching, at step 3, the authentication controller 222 may retrieve previously-stored biometrics of the user and corresponding thresholds from a datastore, such as the memory 206 of the device 200. A threshold associated with a stored biometric may specify how much variance or delta may be allowed when matching a particular biometric with the stored biometric. In some embodiments, the threshold may be a geolocation-based threshold. For instance, the threshold may be based on where the user undergoing the biometric authentication process is currently located and the authentication controller 222 may retrieve the stored biometrics and corresponding geolocation-based thresholds accordingly. In some embodiments, the authentication controller 222 may retrieve the stored biometrics and thresholds from a cloud storage or server, such as server 302.

At step 4, the authentication controller 222 may send the received/captured biometrics from the sensors 208 and the retrieved biometrics from the memory 206 to the biometric matcher 224 for biometric matching. In particular embodiments, the biometric matcher 224 may try to perform biometric authentication by matching the captured biometrics with previously stored biometrics retrieved from the memory 206 of the electronic device 200. In some embodiments, the biometric matcher 224 may perform the biometric matching according to a threshold associated with the stored biometrics. For instance, the biometric matcher 224 may determine whether a match between the received/captured biometrics of the user and previously stored biometrics is within a certain threshold. If it is, then the biometric matcher 224 may successfully authenticate the captured biometrics of the user. If not, then the authentication is unsuccessful. In some embodiments, the biometric matcher 224 may also consider a time of last successful authentication of the user and whether the time at which the current biometrics of the user are received is within a specific pre-configured time range. If it is within the time range, then the biometric matcher 224 may also use this information to validate/invalidate the user. Responsive to performing the biometric match, at step 5, the biometric matcher 224 may send its verification results (e.g., biometrics valid/invalid) to the authentication controller 222. In some embodiments, the biometric matcher 224 may fall back to the ML model 228 directly to perform the biometric authentication, as shown and discussed in reference to FIG. 5.

Upon receiving the verification results from the biometric matcher 224, the authentication controller 222 may perform an appropriate action. For instance, if the result of the verification by the biometric matcher 224 is successful (e.g., biometrics match), then the authentication controller 222 may proceed to step 12 to unlock the device 200 and grant access to the user 302. Otherwise, the authentication controller 222 proceeds to next verifying the captured biometrics using the AI or ML model 228. In the scenario depicted in FIG. 3, the authentication controller 222 receives a failed verification result from the biometric matcher 224. Responsive to receiving the failed authentication, the authentication controller 222 proceeds to performing biometric authentication using the ML model 228. In some embodiments, the biometric matcher 224 may directly proceed to verifying the biometrics using the ML model 228 in case of failed biometric matching by the biometric matcher 224.

To perform the biometric authentication using the AI or ML model 228, the authentication controller 222 may access one or more contextual parameters. As discussed elsewhere herein, the contextual parameters may include parameters affecting or impacting a state of the user that leads to failed biometric authentication using a conventional technique, such as biometric matching. The contextual parameters may include external contextual parameters (e.g., geolocation, time of day, time of year, season, weather conditions, etc.) and/or internal contextual parameters (e.g., user expressions, behavior, pulse rate, etc.). In some embodiments, as shown in step 6a, the authentication controller 222 may access the one or more contextual parameters from the electronic device 200 or 202. For instance, the authentication controller 222 may access the contextual parameters from one or more sensors or components of the device 202. By way of an example and without limitation, the authentication controller 222 may access geolocation from a GPS module on the device 202, weather conditions from a weather sensor, outside temperature or humidity from a temperature sensor, face expressions from the cameras 210, etc. In some embodiments, as shown in step 6b, the authentication controller 222 may access the one or more contextual parameters from a cloud or server 302. For instance, the authentication controller 222 may access or derive additional one or more contextual parameters from the server 302 based on the one or more contextual parameters accessed from the device 202. By way of an example and without limitation, the authentication controller 222 may access a geolocation from the device 202, but may not be able to gather weather conditions from the device 202. The authentication controller 222 may send the geolocation to the server 302 to get the weather conditions for that geolocation.

Next, the authentication controller 222 use the AI or ML model 228 to perform biometric authentication of the user. At step 7, the authentication controller 222 may send the captured biometrics and accessed contextual parameters (from the device 202 and/or the server 302) to the ML model 228 to verify the biometrics. In some embodiments, in addition to the captured biometrics and the contextual information, the authentication controller 222 may also provide device characteristics (e.g., network signal or strength) to the ML model 228. By way of an example and without limitation, in addition to captured fingerprints of the user and weather conditions, the authentication controller 222 may also send indication of the current network signal or network strength of the device to the ML model 228 to performs its verification. The device characteristics may be important because the ML model 228 may be able to determine how much reliability should be given to one or more contextual parameters considering the device characteristics. For example, if the network signal or strength on the device 200 is low or weak, then the ML model 228 may ascertain that the weather conditions it has received may not be current or real time and may represent conditions at a previous time, and therefore making a determination of state of the user and thereby verification of the biometrics may not be very accurate. As such, the ML model 228 may base its judgement also based on the device characteristics at the time the biometrics and the one or more contextual parameters are captured. As discussed elsewhere herein, the ML model 228 may be trained to consider one or more contextual parameters responsible for failed authentication and validate/authenticate biometrics of the user accordingly. Training of the AI or ML model 228 is shown and discussed in detail in reference to at least FIG. 4.

At step 8, the ML model 228 may send its verification results (e.g., biometrics valid/invalid) to the authentication controller 222. Based on the verification results, the authentication controller 222 may perform an appropriate action, as discussed elsewhere herein. In the scenario depicted in FIG. 3, the authentication controller 222 receives a failed verification result from the ML model 228. For instance, the ML model 228 may not be trained enough and sends a failed verification result to the authentication controller 222. Responsive to receiving the failed verification or authentication, the authentication controller 222 proceeds to performing authentication based on user credentials, such as password, pin, etc.

To perform the authentication based on user credentials, at step 9, the authentication controller 222 may send a request to the user 302 to provide user credentials (e.g., password, pin, etc.) that the user uses or has set up in the past to access the device in case of biometric authentication failure. The authentication controller 222 may receive the credentials from the user 302. At step 10, the authentication controller 222 may send the user credentials to the credential checker 226 to verify the biometrics based on the user credentials. The credential checker 226 may verify the received credentials by matching the received credentials with stored credentials in the memory 206 of the electronic device. As an example, the credential checker 226 may receive a 4-digit pin from the user 302 and may verify the pin by comparing and matching it with the stored pin in the memory 206. If the pin matches, then the credential checker 226 may validate the user 302 or confirm that the user 302 trying to access the device is the valid user. Otherwise, the credential checker 226 may invalidate the user. At step 11, the credential checker may send its verification result (e.g., credential matched or not matched, verification passed or not passed) to the authentication controller 222.

Upon receiving the verification results from the credential checker 226, the authentication controller 222 may perform an appropriate action. For instance, if the result of the verification by the credential checker 226 is unsuccessful (e.g., pin/password incorrect), then the authentication controller 222 may restrict access of the electronic device to the user 302. The authentication controller 222 may further send an error message to be displayed on the display 212 of the electronic device. For example, in case the biometric authentication fails using all the authentication methods discussed herein, including authentication by the biometric matcher 224, the AI or ML model 228, and the credential checker 226, the authentication controller sends an error message to be displayed on the display 212 indicating that access is restricted as biometrics of the user 302 cannot be verified.

If the result of the verification by the credential checker 226 is successful (e.g., pin/password is correct), then the authentication controller 222 may proceed to step 12 to unlock the device 200 and grant access to the user 302. At step 13, responsive to determining that the user 302 is actually a valid user (e.g., since the credential checker 226 has confirmed the identity based on the provided user credentials), the authentication controller 222 may train or retrain the AI or ML model 228. For instance, if the ML model 228 has not been trained yet and it is the first time that the model is being trained, then successfully verification of provided biometrics based on user credential check is used as ground truth for training the ML model 228. When training the ML model 228, the authentication controller may send the latest biometrics (e.g., fingerprints) of the user 302 and contextual parameters (e.g., weather conditions, geolocation, time of day, time of year, particular season, etc.) as inputs to the ML model 228 for the training. When re-training the ML model 228, one or more components (e.g., weights and/or biases) of the ML model 228 may be updated to improve the accuracy of biometric authentication when authenticating or verifying the biometrics next time. Detailed description regarding training and/or re-training of the ML model 228 is shown and discussed in reference to FIG. 4.

Figure 4:
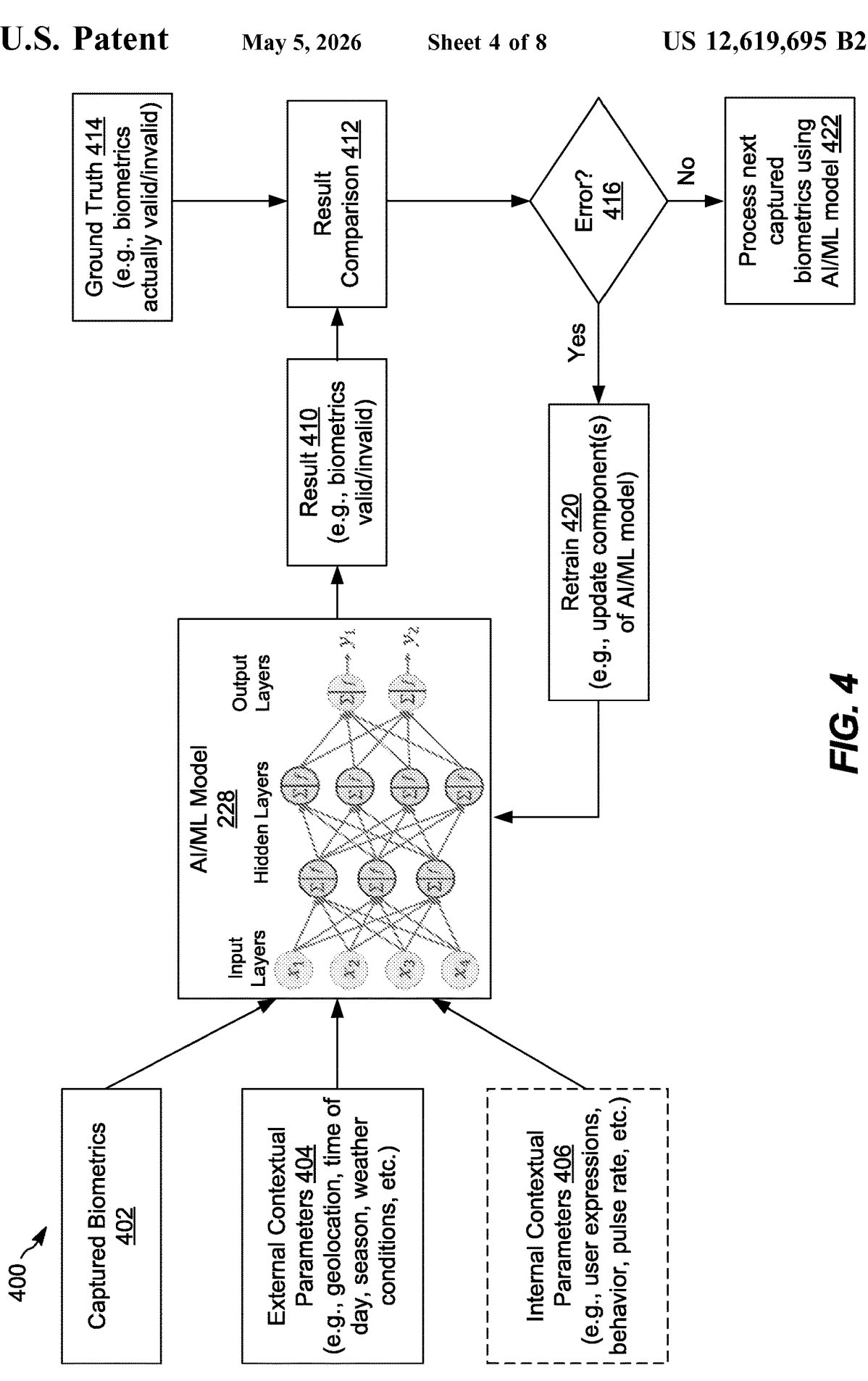
FIG. 4 illustrates an example environment for training a machine-learning model for biometric authentication.

FIG. 4 illustrates an example environment 400 for training a machine-learning model (e.g., AI or ML model 228) for biometric authentication. In some embodiments, the ML model 228 may be trained for a pre-determined number of iterations before being able to be used for biometric authentication discussed herein. By way of an example and without limitation, if the electronic device 200 authenticates a user 20 times in a day whenever the user tries to unlock their device, then at each time instance of those 20 times, the ML model 228 may be trained using the biometrics provided by the user at that time instance and contextual information (e.g., weather conditions, time of day, geolocation, etc.) present during that time instance. For an initial number of iterations, the biometrics may be authenticated using one of the conventional authentication methods or techniques associated with the biometric matcher 224 and the credential checker 226 discussed herein and the authentication results (e.g., biometrics valid or invalid) produced by any one of these conventional techniques may be used as ground truths for training the ML model 228. Operations associated with training the AI or ML model 228 at one particular time instance or iteration is shown and discussed in FIG. 4.

At each training iteration, inputs are provided to the ML model 228 for the training. The training iteration may happen during biometric authentication of a user, as discussed for example in reference to FIG. 3. For instance, the training of the ML model 228 may happen after successfully verifying the biometrics of the user by one or more of the biometric matcher 224 or the credential checker 226. The inputs for training the ML model 228 may include captured biometrics 402 that were used by the biometric matcher 224 and/or the credential checker 226 for authenticating the user and one or more contextual parameters affecting a user's state (e.g., skin dryness) due to which conventional techniques (e.g., biometric matching) have a hard time in correctly recognizing the biometrics 402. As depicted, the contextual parameters that are provided as inputs to the AI or ML model 228 may include external contextual parameters 404 and internal contextual parameters 406. The external contextual parameters 404 may include parameters relating to external environment surrounding the user. For example, the external contextual parameters 404 may include one or more of geolocation, time of day, season, weather conditions, outside temperature, or humidity. The internal contextual parameters 406 may include parameters relating to internal mood or behavior of the user. For example, the internal contextual parameters 406 may include one or more of user behavior, user mood, user pulse rate, user heart rate, or user expressions. These external contextual parameters 404 and internal contextual parameters 406 may be accessed from one or more of sensors 208 of the device or the server 302, as discussed in reference to FIG. 3.

In some embodiments, internal contextual parameters 406 may be additionally provided to the ML model 228 as they may also be an important factor when making a determination on user's authenticity. The internal contextual parameters 406 may help the ML model 228 to generate more accurate results and avoid generating false positives (e.g., determine fingerprints of a fraudulent user as valid). For instance, how the user's behavior or expressions look like when they are trying to access the device, such as device 200. If the user looks worried, tensed, or in a rush, then it may be a sign of a fraudulent user who is trying to gain access to the device. Similarly, if the user's pulse or heart rate is high when the user is trying to access the device, then it may also be a sign of the fraudulent user. Whereas, if the user looks relaxed, happy, and body temperature and pulse rate are normal, then these may be signs of a genuine user of the device. In some embodiments, the internal contextual parameters 406 may be optional (as shown by the dotted lines) and only the external contextual parameters 404 along with the captured biometrics 402 may be provided to the ML model 228 for biometric authentication.

In some embodiments, although not shown, one or more device characteristics may also be provided as an input to the AI or ML model 228 to further improve accuracy of the model for biometric authentication. The one or more device characteristics may help the ML model 228 to eliminate one or more contextual parameters 404 or 406 and determine how much weightage should be given to the one or more contextual parameters it has received when doing the biometric authentication. By way of an example and without limitation, the ML model 228 may receive weather data as one of the contextual parameters and network signal or strength of the device as one of the device characteristics. If the network signal is strong, the ML model 228 may give a high weightage to the weather data as a good or strong network signal may be indicator of the weather data being fetched by the device in real-time or is up to date. Whereas if the network signal is weak, then the ML model 228 may give a low weightage to the weather data or may completely eliminate the weather data as a weak network signal may be an indicator of the weather data being received at a previous time or is not current, and therefore basing the decision of biometric authentication based on staled weather data may not be accurate.

In some embodiments, the user of the device may select one or more contextual parameters (e.g., external contextual parameters 404, internal contextual parameters 406) and corresponding weights for these parameters based on which the ML model 228 should be trained. For example, the user may select geolocation parameter and not weather parameter for training the model 228. This configuration may be entirely at user's discretion and may change over time. In a default configuration, all the contextual parameters that are available at a particular time instance may be selected for the training. In some embodiments, the user of the device may choose to enable/disable or turn on/off training of the ML model 228 at one or more time instances or training iterations. For example, in auto off mode, the user may revisit last N authentication and specify which of the parameters have the most weights and this feedback may be used in calculating the loss or cost function and in general the back propagation to improve the training accuracy. In an auto training mode, the ML model 228 may be trained every time the user is undergoing biometric authentication to access the device, such as device 200.

In particular embodiments, the captured biometrics 402, the external contextual parameters 404, optional contextual parameters 406, and optional device characteristics (not shown) may be provided as inputs to the AI or ML model 228. For instance, the input layers shown in the model 228 may represent different parameters or variables that have been passed to the model. Calculations may be performed in one or more hidden layers of the model 228. These calculations may take into consideration the different values of the input parameters to yield a result 410. The result 410 may be produced by the output layers of the ML model 228. The result 410 may include whether the captured biometrics 402 at a particular time instance are valid or invalid. The result 410 may be based on one or more of the external contextual parameters 404 or internal contextual parameters 406. By way of an example and without limitation, the ML model 228 may be trained to verify whether the biometrics 402 (e.g., fingerprints) are valid based on geolocation, time of day, and weather conditions present at the time the biometrics 402 are captured.

In particular embodiments, a training component on the user's device (e.g., device 200) may perform a result comparison 412. The result comparison 412 may include comparing the result 410 generated by the ML model 228 with a ground truth 414. The ground truth 414 may include actual or true verification result of the captured biometrics 402 (i.e., whether the captured biometrics 402 are actually valid/ invalid or belongs to the actual user or not). The ground truth 414 may be based on verifications performed by one or more of the conventional methods of biometric authentication discussed herein. For instance, the ground truth 414 may be based on a successful verification performed by the credential checker 226. Based on the result comparison 412, the training component may compute a loss function, which may indicate a delta between the result 410 and the ground truth 414. If the loss function results in no error (e.g., result

410 is same as ground truth 414), then the training component may proceed to the next training iteration to process 422 next captured biometrics (e.g., fingerprints) using the ML model 228. The operations discussed with respect to FIG. 4 may be repeated for a preset number of iterations or until the ML model 228 is determined to be sufficiently trained.

If on the other hand, the loss function indicates an error 416 (e.g., result 410 is different from ground truth 414), then the training component may retrain 420 the AI or ML model 228. In particular embodiments, retraining the ML model 228 may include updating one or more components of the model 228. For instance, weights and/or biases of one or more layers of the ML model 228 may be updated. As an example, weights and/or biases of one or more of the input layers or the hidden layers in the model 228 may be readjusted. Readjusting the weights and/or biases may include calculating partial derivatives all the way from the last hidden layer to the first hidden layer of the model 228. In some embodiments, feedback from a user may be used to retrain the model 228. Retraining the ML model 228 may improve the accuracy of the model in performing subsequent biometric authentication(s).

Figure 5:
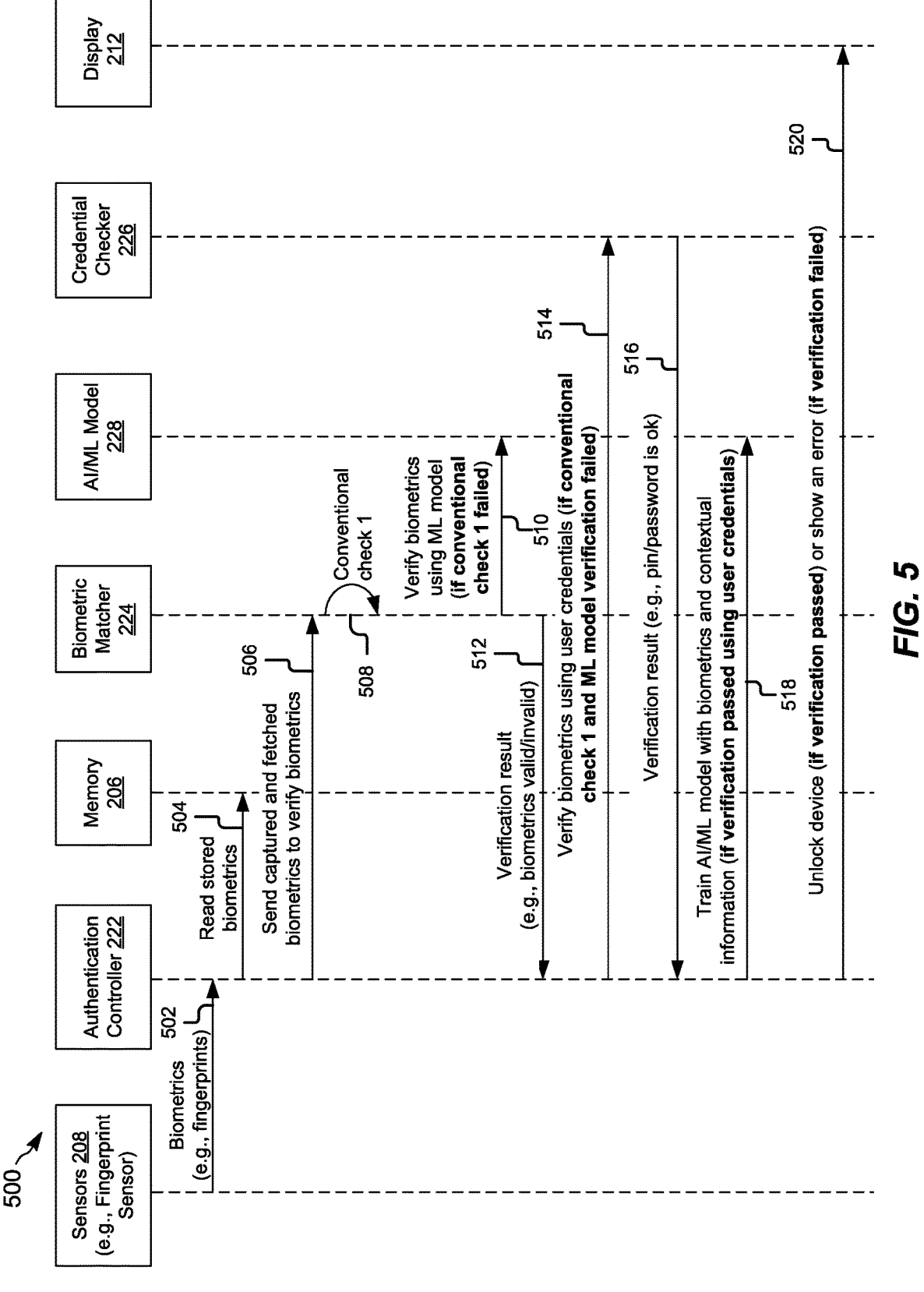
FIG. 5 illustrates an example signal or interaction flow diagram depicting example interactions between various components of an electronic device for biometric authentication.

FIG. 5 illustrates an example signal or interaction flow diagram 500 depicting example interactions between various components of an electronic device for biometric authentication. As depicted, a user provides their biometrics (e.g., fingerprints) to the electronic device, such as device 200 or 202. The biometrics are received by sensors 208 (e.g., fingerprint sensor), which passes the biometrics to the authentication controller 222, as indicated by reference numeral 502. The authentication controller 222 may fetch previously-stored biometrics of the user from the memory 206, as indicated by reference numeral 504, and pass the fetched biometrics along with captured biometrics to the biometric matcher 224, as indicated by reference numeral 506. The biometric matcher 224 may first try to use a conventional method to check the captured biometrics, as indicated by reference numeral 508. For instance, the bio-metric matcher 224 may try to verify whether the captured biometrics belongs to the user or not by matching vectors of the captured biometrics with fetched biometrics from the memory 206. In some embodiments, verification by the biometric matcher 224 may be skipped and the authentica-tion controller 222 may perform the verification directly using the AI or ML model 228.

If the first conventional method fails, the biometric matcher 224 may then try to verify the biometrics using the AI or ML model 228, as indicated by reference numeral 510. The ML model 228 may be a system, which employs machine learning to recognize biometrics using the captured biometrics and all contextual information (e.g., external contextual parameters 404, internal contextual parameters 406) available at the specified moment. The machine learn-ing is best to use one of the known neural networks with input layers, number of hidden layers, and output layers due to its high precision. The ML model 228 may return a verification result, as indicated by reference numeral 512. The verification result may indicate whether the captured biometrics are valid or invalid or whether or not the captured biometrics belong to the user of the device. Verification using the model 228 may fail due to the model not being sufficiently trained. If the verification using the ML model 228 fails, then the authentication controller 222 may ask the user to provide user credentials (e.g., pin, password) and send captured biometrics along with the user credentials (e.g., pin, password) to the biometric checker 226 for the verification, as indicated by reference numeral 514.

The biometric checker 226 may verify the user based on user credentials and send verification result, as indicated by reference numeral 516. The verification result produced by the credential checker 226 may indicate whether the provided pin or password is ok. If the verification by the credential checker 226 is successful, the authentication controller 222 may initiate training of the AI or ML model 228 in the background with the available captured biometrics and contextual information, as indicated by reference numeral 518. Also, the authentication controller 222 may unlock the device if the verification is passed or show an error on the display 212 of the device if the verification is failed, as indicated by reference numeral 520.

FIG. 6 illustrates a flow diagram of an example method 600 for biometric authentication of a user using a trained machine-learning model (e.g., AI or ML model 228), in accordance with the presently disclosed embodiments. The method 600 may be performed utilizing one or more processing devices (e.g., the one or more processors 204 of the electronic device 200 or 202) that may include hardware (e.g., a general purpose processor, a graphic processing unit (GPU), an application-specific integrated circuit (ASIC), a system-on-chip (SoC), a microcontroller, a field-program-mable gate array (FPGA), a central processing unit (CPU), an application processor (AP), a visual processing unit (VPU), a neural processing unit (NPU), a neural decision processor (NDP), or any other processing device(s) that may be suitable for processing image data), software (e.g., instructions running/executing on one or more processors), firmware (e.g., microcode), or some combination thereof.

The method 600 may begin at block 610 with one or more processing devices (e.g., one or more processors 204 of the electronic device) receiving biometrics of a user to access an electronic device. The biometrics may include, for example and without limitation, user's fingerprints, retina, iris, face, voice, etc. The method 600 may then continue at block 620 with the one or more processing devices (e.g., one or more processors 204 of the electronic device) accessing one or more contextual parameters affecting a state of the user. The state of the user may include a skin condition of the user, such as skin dryness. In particular embodiments, the one or more contextual parameters may include one or more of external contextual parameters or internal contextual parameters. The external contextual parameters may include parameters relating to external environment surrounding the user. As an example and without limitation, the external contextual parameters may include one or more of geolocation, time of day, season, weather conditions, outside temperature, or humidity. The internal contextual parameters may include parameters relating to internal mood or behavior of the user. As an example and without limitation, the internal contextual parameters may include one or more of user behavior, user mood, user pulse rate, user heart rate, or user expressions.

The method 600 may then continue at block 630 with the one or more processing devices (e.g., one or more processors 204 of the electronic device) verifying, using a trained machine-learning model (e.g., AI or ML model 228), the biometrics of the user based on the one or more contextual parameters affecting the state of the user. In some embodiments, prior to verifying the biometrics of the user using the trained machine-learning model, the one or more processing devices may verify the biometrics of the user using a first conventional technique of user authentication. The first conventional technique of user authentication may include matching the biometrics with stored biometrics in a data store, such as memory 206. In some embodiments, verifying the biometrics of the user using the first conventional technique may include determining whether a match between the biometrics of the user and previously stored biometrics is within a certain threshold and determining whether a time of last successful verification is within a specific pre-configured time range. This may play an important role to reduce the number of failed authentications at the new location/context while the machine-learning model is still under training. Readjusting the weights and biases to new contexts requires more test samples and takes time. Determining that the verification using the first conventional technique is unsuccessful may include determining that the match between the biometrics of the user and the previously stored biometrics is beyond the certain threshold and determining that the time of last successful verification is outside of the specific pre-configured time range.

Based on the verification using the first conventional technique, the one or more processing devices may determine that the verification using the first conventional technique is unsuccessful. Responsive to determining that the verification using the first conventional technique (e.g., biometric matching) is unsuccessful, verification using the trained machine-learning model is performed, as discussed elsewhere herein. If the verification using the trained machine-learning model is successful, the method 600 may continue at block 640 with the one or more processing devices (e.g., one or more processors 204 of the electronic device) providing access to the electronic device in response to successful verification.

In some embodiments, the one or more processing devices may determine that the verification using the trained machine-learning model (e.g., AI or ML model 228) is also unsuccessful. Responsive to determining that the verification using the trained machine-learning model is unsuccessful, the one or more processing devices may then verify the biometrics of the user using a second conventional technique of user authentication. The second conventional technique of user authentication may include requesting the user to manually provide authentication credentials, such as pin and/or password.

If the verification using the second conventional technique is successful, the one or more processing devices may re-train the machine-learning model based on the biometrics of the user, one or more contextual parameters, and a label indicating that the biometrics of the user are valid. In some embodiments, the label indicating whether the biometrics of the user are valid or invalid may serve as ground truth for training the model. In particular embodiments, re-training the machine-learning model may include updating one or more components of the machine-learning model. If the verification using the second conventional technique is unsuccessful, the one or more processing devices may restrict access to the electronic device in response to unsuccessful verifications using the first conventional technique (e.g., biometric matching by biometric matcher 224), the trained machine-learning model (e.g., AI or ML model 228), and the second conventional technique (e.g., user authentication by credential checker 226).

In particular embodiments, the one or more processing devices (e.g., one or more processors 204 of the electronic device) may be further configured to train the machine-learning model for biometric authentication. Training the machine-learning model may include receiving, at a plurality of time instances, the biometrics of the user and for each time instance of the plurality of time instances, training the machine-learning model by (1) verifying, using one or more of a first conventional technique (e.g., biometric matching) or a second conventional technique (e.g., user credentials check) of user authentication, the biometrics of the user, (2) determining that the biometrics of the user received at the particular time instance are valid based on verifying the biometrics using one or more of the first conventional technique or the second conventional technique, (3) accessing a set of contextual parameters affecting the state of the user at the particular time instance, and (4) providing the biometrics received at the particular time instance and the set of contextual parameters affecting the state of the user at the particular time instance as inputs for training the machine-learning model for user authentication. In particular embodiments, the determination that the biometrics of the user received at the particular time instance are valid according to the first conventional technique or the second conventional technique is used as ground truth for training the machine-learning model.

In some embodiments, the one or more processing devices (e.g., one or more processors 204 of the electronic device 202) may enable the user to select one or more contextual parameters from the set of contextual parameters and weightage for each of the one or more contextual parameters for training the machine-learning model. The machine-learning model may be trained based on user selected contextual parameters and associated weightage. In some embodiments, the one or more processing devices may enable the user to enable or disable training of the machine-learning at one or more time instances. In some embodiments, the one or more processing devices may enable the user to choose whether to use trained machine-learning model for user authentication at one or more time instances.

Figure 7:
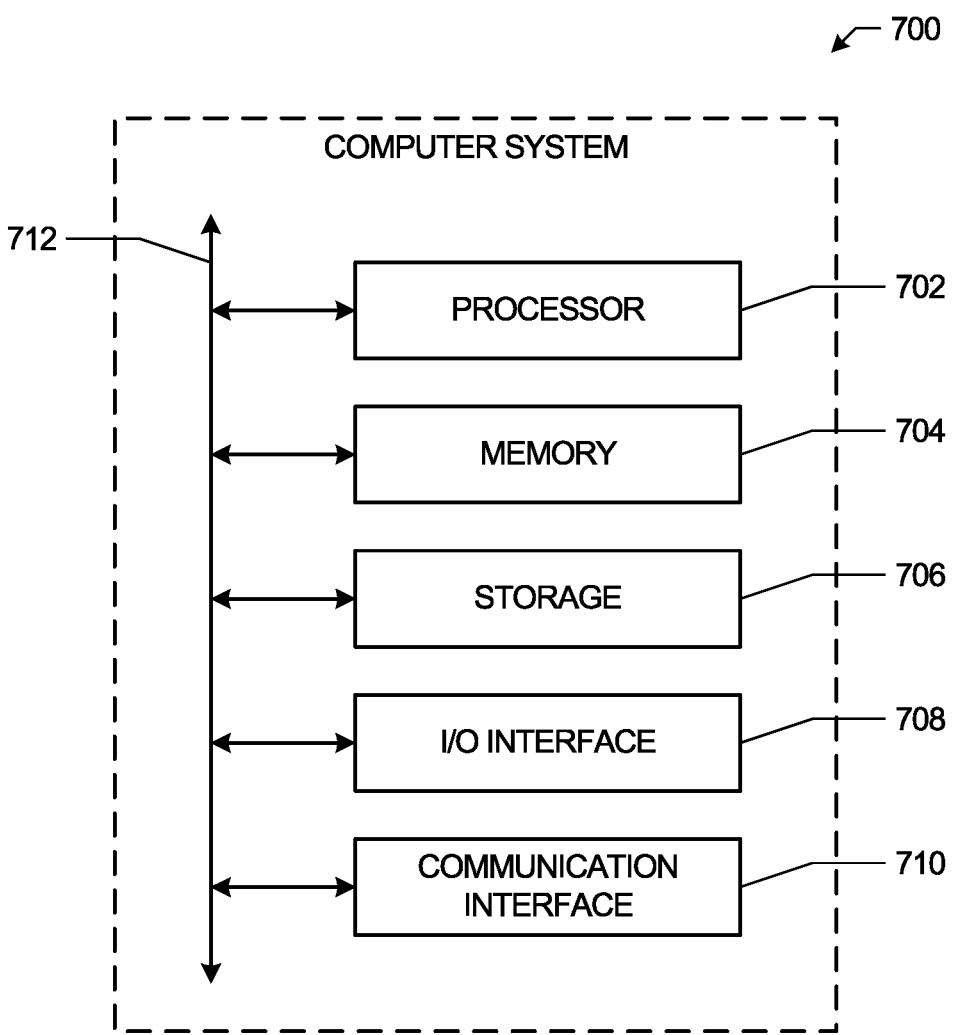
FIG. 7 illustrates an example computer system.

FIG. 7 illustrates an example computer system 700 that may be utilized for verifying, authenticating, or validating biometrics of a user, in accordance with the presently disclosed embodiments. In particular embodiments, one or more computer systems 700 perform one or more steps of one or more methods or processes described or illustrated herein. In particular embodiments, one or more computer systems 700 provide functionality described or illustrated herein. In particular embodiments, software running on one or more computer systems 700 performs one or more steps of one or more methods or processes described or illustrated herein or provides functionality described or illustrated herein. Particular embodiments include one or more portions of one or more computer systems 700. Herein, reference to a computer system may encompass a computing device, and vice versa, where appropriate. Moreover, reference to a computer system may encompass one or more computer systems, where appropriate.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (e.g., a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 700 may include one or more computer systems 700; be unitary or distributed; span multiple locations; span multiple machines; span multiple data centers; or reside in a cloud, which may include one or more cloud components in one or more networks.

Where appropriate, one or more computer systems 700 may perform without substantial spatial or temporal limitation one or more steps of one or more methods or processes described or illustrated herein. As an example, and not by way of limitation, one or more computer systems 700 may perform in real time or in batch mode one or more steps of one or more methods or processes described or illustrated herein. One or more computer systems 700 may perform at different times or at different locations one or more steps of one or more methods or processes described or illustrated herein, where appropriate.

In particular embodiments, computer system 700 includes a processor 702, memory 704, storage 706, an input/output (I/O) interface 706, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. As an example, and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. This disclosure contemplates processor 702 including any suitable number of any suitable internal caches, where appropriate. As an example, and not by way of limitation, processor 702 may include one or more instruction caches, one or more data caches, and one or more translation lookaside buffers (TLBs). Instructions in the instruction caches may be copies of instructions in memory 704 or storage 706, and the instruction caches may speed up retrieval of those instructions by processor 702.

Data in the data caches may be copies of data in memory 704 or storage 706 for instructions executing at processor 702 to operate on; the results of previous instructions executed at processor 702 for access by subsequent instructions executing at processor 702 or for writing to memory 704 or storage 706; or other suitable data. The data caches may speed up read or write operations by processor 702. The TLBs may speed up virtual-address translation for processor 702. In particular embodiments, processor 702 may include one or more internal registers for data, instructions, or addresses. This disclosure contemplates processor 702 including any suitable number of any suitable internal registers, where appropriate. Where appropriate, processor 702 may include one or more arithmetic logic units (ALUs); be a multi-core processor; or include one or more processors 702. Although this disclosure describes and illustrates a particular processor, this disclosure contemplates any suitable processor.

In particular embodiments, memory 704 includes main memory for storing instructions for processor 702 to execute or data for processor 702 to operate on. As an example, and not by way of limitation, computer system 700 may load instructions from storage 706 or another source (such as, for example, another computer system 700) to memory 704. Processor 702 may then load the instructions from memory

704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere).

One or more memory buses (which may each include an address bus and a data bus) may couple processor 702 to memory 704. Bus 712 may include one or more memory buses, as described below. In particular embodiments, one or more memory management units (MMUs) reside between processor 702 and memory 704 and facilitate accesses to memory 704 requested by processor 702. In particular embodiments, memory 704 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 704 may include one or more memories 704, where appropriate. Although this disclosure describes and illustrates particular memory, this disclosure contemplates any suitable memory.

In particular embodiments, storage 706 includes mass storage for data or instructions. As an example, and not by way of limitation, storage 706 may include a hard disk drive (HDD), a floppy disk drive, flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 706 includes hardware, software, or both, providing one or more interfaces for communication between computer system 700 and one or more I/O devices. Computer system 700 may include one or more of these I/O devices, where appropriate. One or more of these I/O devices may enable communication between a person and computer system 700. As an example, and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 706 for them. Where appropriate, I/O interface 706 may include one or more device or software drivers enabling processor 702 to drive one or more of these I/O devices. I/O interface 706 may include one or more I/O interfaces 706, where appropriate. Although this disclosure describes and illustrates a particular I/O interface, this disclosure contemplates any suitable I/O interface.

In particular embodiments, communication interface 710 includes hardware, software, or both providing one or more interfaces for communication (such as, for example, packet-based communication) between computer system 700 and one or more other computer systems 700 or one or more networks. As an example, and not by way of limitation, communication interface 710 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 710 for it.

As an example, and not by way of limitation, computer system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware, software, or both coupling components of computer system 700 to each other. As an example, and not by way of limitation, bus 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs. magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

AI Architecture

Figure 8:
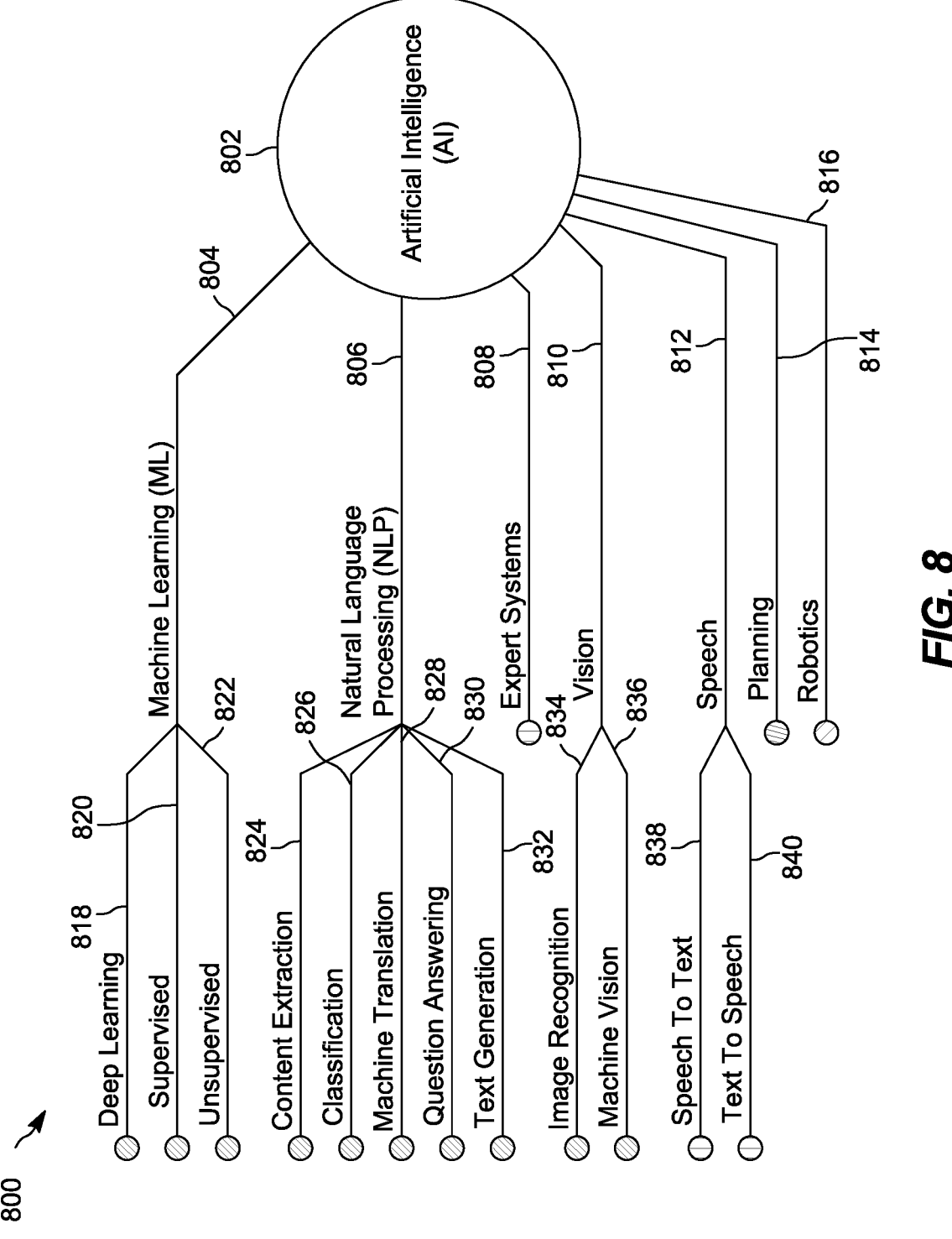
FIG. 8 illustrates a diagram of an example artificial intelligence (AI) architecture.

FIG. 8 illustrates a diagram 800 of an example artificial intelligence (AI) architecture 802 that may be utilized to perform verification, authentication, or validation of biometrics of a user, in accordance with the presently disclosed embodiments. In particular embodiments, the AI architecture 802 may be implemented utilizing, for example, one or more processing devices (e.g., one or more processors 204 of the electronic device 200 or 202) that may include hardware (e.g., a general purpose processor, a graphic processing unit (GPU), an application-specific integrated circuit (ASIC), a system-on-chip (SoC), a microcontroller, a field-programmable gate array (FPGA), a central processing unit (CPU), an application processor (AP), a visual processing unit (VPU), a neural processing unit (NPU), a neural decision processor (NDP), and/or other processing device(s) that may be suitable for processing various data and making one or more decisions based thereon), software (e.g., instructions running/executing on one or more processing devices), firmware (e.g., microcode), or some combination thereof.

In particular embodiments, as depicted by FIG. 8, the AI architecture 802 may include machine leaning (ML) algorithms and functions 804, natural language processing (NLP) algorithms and functions 806, expert systems 808, computer-based vision algorithms and functions 810, speech recognition algorithms and functions 812, planning algorithms and functions 814, and robotics algorithms and functions 816. In particular embodiments, the ML algorithms and functions 804 may include any statistics-based algorithms that may be suitable for finding patterns across large amounts of data (e.g., "Big Data" such as user click data or other user interactions, text data, image data, video data, audio data, speech data, numbers data, and so forth). For example, in particular embodiments, the ML algorithms and functions 804 may include deep learning algorithms 818, supervised learning algorithms 820, and unsupervised learning algorithms 822.

In particular embodiments, the deep learning algorithms 818 may include any artificial neural networks (ANNs) that may be utilized to learn deep levels of representations and abstractions from large amounts of data. For example, the deep learning algorithms 818 may include ANNs, such as a multilayer perceptron (MLP), an autoencoder (AE), a convolution neural network (CNN), a recurrent neural network (RNN), long short term memory (LSTM), a grated recurrent unit (GRU), a restricted Boltzmann Machine (RBM), a deep belief network (DBN), a bidirectional recurrent deep neural network (BRDNN), a generative adversarial network (GAN), and deep Q-networks, a neural autoregressive distribution estimation (NADE), an adversarial network (AN), attentional models (AM), deep reinforcement learning, and so forth.

In particular embodiments, the supervised learning algorithms 820 may include any algorithms that may be utilized to apply, for example, what has been learned in the past to new data using labeled examples for predicting future events. For example, starting from the analysis of a known training dataset, the supervised learning algorithms 820 may produce an inferred function to make predictions about the output values. The supervised learning algorithms 820 can also compare its output with the correct and intended output and find errors in order to modify the supervised learning algorithms 820 accordingly. On the other hand, the unsupervised learning algorithms 822 may include any algorithms that may applied, for example, when the data used to train the unsupervised learning algorithms 822 are neither classified or labeled. For example, the unsupervised learning algorithms 822 may study and analyze how systems may infer a function to describe a hidden structure from unlabeled data.

In particular embodiments, the NLP algorithms and functions 806 may include any algorithms or functions that may be suitable for automatically manipulating natural language, such as speech and/or text. For example, in particular embodiments, the NLP algorithms and functions 806 may include content extraction algorithms or functions 824, classification algorithms or functions 826, machine translation algorithms or functions 828, question answering (QA) algorithms or functions 830, and text generation algorithms or functions 832. In particular embodiments, the content extraction algorithms or functions 824 may include a means for extracting text or images from electronic documents (e.g., webpages, text editor documents, and so forth) to be utilized, for example, in other applications.

In particular embodiments, the classification algorithms or functions 826 may include any algorithms that may utilize a supervised learning model (e.g., logistic regression, naïve Bayes, stochastic gradient descent (SGD), k-nearest neighbors, decision trees, random forests, support vector machine (SVM), and so forth) to learn from the data input to the supervised learning model and to make new observations or classifications based thereon. The machine translation algorithms or functions 828 may include any algorithms or functions that may be suitable for automatically converting source text in one language, for example, into text in another language. The QA algorithms or functions 830 may include any algorithms or functions that may be suitable for automatically answering questions posed by humans in, for example, a natural language, such as that performed by voice-controlled personal assistant devices. The text generation algorithms or functions 832 may include any algorithms or functions that may be suitable for automatically generating natural language texts.

In particular embodiments, the expert systems 808 may include any algorithms or functions that may be suitable for simulating the judgment and behavior of a human or an organization that has expert knowledge and experience in a particular field (e.g., stock trading, medicine, sports statistics, and so forth). The computer-based vision algorithms and functions 810 may include any algorithms or functions that may be suitable for automatically extracting information from images (e.g., photo images, video images). For example, the computer-based vision algorithms and functions 810 may include image recognition algorithms 834 and machine vision algorithms 836. The image recognition algorithms 834 may include any algorithms that may be suitable for automatically identifying and/or classifying objects, places, people, and so forth that may be included in, for example, one or more image frames or other displayed data. The machine vision algorithms 836 may include any algorithms that may be suitable for allowing computers to "see", or, for example, to rely on image sensors cameras with specialized optics to acquire images for processing, analyzing, and/or measuring various data characteristics for decision making purposes.

In particular embodiments, the speech recognition algorithms and functions 812 may include any algorithms or functions that may be suitable for recognizing and translating spoken language into text, such as through automatic speech recognition (ASR), computer speech recognition, speech-to-text (STT), or text-to-speech (TTS) in order for the computing to communicate via speech with one or more users, for example. For example, the speech recognition algorithms and functions 812 may include speech to text algorithms 838 and text to speech algorithms 840. The speech to text algorithms 838 may include any algorithms that may be suitable for recognizing and translating spoken language into text. The text to speech algorithms 840 may include any algorithms that may be suitable for recognizing and translating text into spoken language.

In particular embodiments, the planning algorithms and functions 814 may include any algorithms or functions that may be suitable for generating a sequence of actions, in which each action may include its own set of preconditions to be satisfied before performing the action. Examples of AI planning may include classical planning, reduction to other problems, temporal planning, probabilistic planning, preference-based planning, conditional planning, and so forth. Lastly, the robotics algorithms and functions 816 may include any algorithms, functions, or systems that may enable one or more devices to replicate human behavior through, for example, motions, gestures, performance tasks, decision-making, emotions, and so forth.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Miscellaneous

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

Herein, "automatically" and its derivatives means "without human intervention," unless expressly indicated otherwise or indicated otherwise by context.

The embodiments disclosed herein are only examples, and the scope of this disclosure is not limited to them. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled. operable, or operative. Additionally, although this disclosure describes or illustrates particular embodiments as providing particular advantages, particular embodiments may provide none, some, or all of these advantages.

What is claimed is:

1. A method, performed by an electronic device, comprising:

receiving biometrics of a user to access the electronic device;

accessing one or more contextual parameters affecting a state of the user, wherein the one or more contextual parameters comprise at least one or more external contextual parameters relating to an external environment surrounding the user at a time when the biometrics of the user are received;

verifying, using a trained machine-learning model, the biometrics of the user by providing as inputs, to the trained machine-learning model, the biometrics of the user and the at least one or more external contextual parameters relating to the external environment surrounding the user, wherein the trained machine-learning model is trained, for a pre-determined number of training iterations, based on a plurality of user biometrics captured at a plurality of time instances, contextual parameters affecting a user state at each of the plurality of time instances, and ground truth data representing verified authentication results produced for the plurality of user biometrics by one or more of a first conventional technique or a second conventional technique of user authentication, and wherein, at each training iteration, the trained machine-learning model is configured to generate an output based on captured user biometrics at a particular time instance and a set of contextual parameters affecting the user state at the particular time instance; and providing access to the electronic device in response to successful verification.

2. The method of claim 1, wherein prior to verifying the biometrics of the user using the trained machine-learning model:

verifying the biometrics of the user using the first conventional technique of user authentication; and determining that verification using the first conventional technique is unsuccessful, wherein the verification using the trained machine-learning model is performed in response to determining that the verification using the first conventional technique is unsuccessful.

3. The method of claim 2, wherein the first conventional technique of user authentication comprises matching the biometrics with stored biometrics in a data store.

4. The method of claim 2, wherein:

verifying the biometrics of the user using the first conventional technique comprises:

determining whether a match between the biometrics of the user and previously stored biometrics is within a certain threshold; and determining whether a time of last successful verification is within a specific pre-configured time range; and determining that the verification using the first conventional technique is unsuccessful comprises:

determining that the match between the biometrics of the user and the previously stored biometrics is beyond the certain threshold; and determining that the time of last successful verification is outside of the specific pre-configured time range.

5. The method of claim 2, further comprising:

determining that the verification using the trained machine-learning model is unsuccessful;

in response to determining that the verification using the trained machine-learning model is unsuccessful, verifying the biometrics of the user using the second conventional technique of user authentication;

determining that the verification using the second conventional technique is successful; and re-training the trained machine-learning model based on the biometrics of the user, the one or more contextual parameters, and a label indicating that the biometrics of the user are valid.

6. The method of claim 5, wherein the second conventional technique of user authentication comprises requesting the user to manually provide authentication credentials.

7. The method of claim 5, wherein re-training the trained machine-learning model comprises updating one or more components of the trained machine-learning model.

8. The method of claim 2, further comprising:

determining that the verification using the trained machine-learning model is unsuccessful;

in response to determining that the verification using the trained machine-learning model is unsuccessful, verifying the biometrics of the user using the second conventional technique of user authentication;

determining that the verification using the second conventional technique is unsuccessful; and restricting access to the electronic device in response to unsuccessful verifications using the first conventional technique, the trained machine-learning model, and the second conventional technique.

9. The method of claim 1, where the biometrics comprise one or more of fingerprints, retina, face, or voice of the user.

10. The method of claim 1, where the state of the user comprises a skin condition of the user.

11. The method of claim 1, where the one or more contextual parameters further comprise:

internal contextual parameters relating to internal mood or behavior of the user.

12. The method of claim 1, wherein the one or more external contextual parameters comprise one or more of geolocation, time of day, season, weather conditions, outside temperature, or humidity.

13. The method of claim 11, wherein the internal contextual parameters comprise one or more of user behavior, user mood, user pulse rate, user heart rate, or user expressions.

14. The method of claim 1, further comprising training the machine-learning model, wherein training the machine-learning model comprises:

receiving, at the plurality of time instances, the plurality of user biometrics; and for each particular time instance of the plurality of time instances, training the machine-learning model by:

verifying, using one or more of the first conventional technique or the second conventional technique of user authentication, the captured user biometrics at the particular time instance;

determining that the captured user biometrics at the particular time instance are valid based on verifying the biometrics using one or more of the first conventional technique or the second conventional technique;

accessing the set of contextual parameters affecting the user state at the particular time instance; and providing the captured user biometrics at the particular time instance and the set of contextual parameters affecting the user state at the particular time instance as inputs for training the machine-learning model for user authentication.

15. The method of claim 14, further comprising:

enabling the user to select one or more contextual parameters from the set of contextual parameters and weightage for each of the one or more contextual parameters for training the machine-learning model, wherein the machine-learning model is trained based on user selected contextual parameters and associated weightage.

16. The method of claim 14, further comprising:

enabling the user to enable or disable training of the machine-learning at one or more time instances.

17. The method of claim 14, further comprising:

enabling the user to choose whether to use trained machine-learning model for user authentication at one or more time instances.

18. The method of claim 14, wherein the determination that the captured user biometrics at the particular time instance are valid according to the first conventional technique or the second conventional technique is used as ground truth for training the machine-learning model.

19. An electronic device comprising:

one or more non-transitory computer-readable storage media including instructions; and one or more processors coupled to the storage media, the one or more processors configured to execute the instructions to:

receive biometrics of a user to access the electronic device;

access one or more contextual parameters affecting a state of the user, wherein the one or more contextual parameters comprise at least one or more external contextual parameters relating to an external environment surrounding the user at a time when the biometrics of the user are received;

verify, using a trained machine-learning model, the biometrics of the user by providing as inputs, to the trained machine-learning model, the biometrics of the user and the at least one or more external contextual parameters relating to the external environment surrounding the user, wherein the trained machine-learning model is trained, for a pre-determined number of training iterations, based on a plurality of user biometrics captured at a plurality of time instances, contextual parameters affecting a user state at each of the plurality of time instances, and ground truth data representing verified authentication results produced for the plurality of user biometrics by one or more of a first conventional technique or a second conventional technique of user authentication, and wherein, at each training iteration, the trained machine-learning model is configured to generate an output based on captured user biometrics at a particular time instance and a set of contextual parameters affecting the user state at the particular time instance; and provide access to the electronic device in response to successful verification.

20. A non-transitory computer-readable medium comprising instructions that, when executed by one or more processors of an electronic device, cause the one or more processors to:

receive biometrics of a user to access the electronic device;

access one or more contextual parameters affecting a state of the user, wherein the one or more contextual parameters comprise at least one or more external contextual parameters relating to an external environment surrounding the user at a time when the biometrics of the user are received;

verify, using a trained machine-learning model, the biometrics of the user by providing as inputs, to the trained machine-learning model, the biometrics of the user and the at least one or more external contextual parameters relating to the external environment surrounding the user, wherein the trained machine-learning model is trained, for a pre-determined number of training iterations, based on a plurality of user biometrics captured at a plurality of time instances, contextual parameters affecting a user state at each of the plurality of time instances, and ground truth data representing verified authentication results produced for the plurality of user biometrics by one or more of a first conventional technique or a second conventional technique of user authentication, and wherein, at each training iteration, the trained machine-learning model is configured to generate an output based on captured user biometrics at a particular time instance and a set of contextual parameters affecting the user state at the particular time instance; and provide access to the electronic device in response to successful verification.

* * * * *